United States Patent
Wolff et al.

(10) Patent No.: US 8,168,553 B2
(45) Date of Patent: May 1, 2012

(54) OPTICAL GLASS, METHOD OF MAKING THE OPTICAL GLASS, OPTICAL ELEMENTS MADE WITH THE OPTICAL GLASS AND USES THEREOF

(75) Inventors: Silke Wolff, Hueckeswagen (DE); Stefanie Hansen, Gensingen (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 60 days.

(21) Appl. No.: 12/712,601

(22) Filed: Feb. 25, 2010

(65) Prior Publication Data
US 2010/0227753 A1   Sep. 9, 2010

(30) Foreign Application Priority Data

Mar. 6, 2009 (DE) .................. 10 2009 011 508

(51) Int. Cl.
*C03C 3/16*   (2006.01)
*C03C 3/062*   (2006.01)

(52) U.S. Cl. ............. 501/45; 501/46; 501/47; 501/48; 501/77; 501/78; 501/79

(58) Field of Classification Search .......... 501/46–52, 501/73, 77–79, 45
See application file for complete search history.

(56) References Cited

U.S. PATENT DOCUMENTS

| | | | |
|---|---|---|---|
| 3,216,836 A | 11/1965 | Jahn | |
| 4,261,751 A * | 4/1981 | Nakamura et al. | 501/42 |
| 5,022,921 A | 6/1991 | Aitken | |
| 5,668,066 A * | 9/1997 | Oguma et al. | 501/45 |
| 6,225,244 B1 * | 5/2001 | Oguma | 501/45 |
| 7,605,100 B2 | 10/2009 | Wolff et al. | |
| 2004/0138043 A1 | 7/2004 | Kasuga et al. | |

FOREIGN PATENT DOCUMENTS

| | | |
|---|---|---|
| DE | 1 089 934 | 9/1960 |
| DE | 10 2005 005 994 | 8/2006 |
| JP | 60-171244 | 9/1985 |
| JP | 63-11544 | 1/1988 |
| JP | 2-124743 | 5/1990 |
| JP | 9-278479 | 10/1997 |
| JP | 102 39 572 | 1/2004 |
| JP | 2007-70194 | 3/2007 |

OTHER PUBLICATIONS

International Standard ISO 8424, "Raw Optical Glass—Resisyance to Attack by . . ." Second Edition, Jun. 15, 1996.
International Standard ISO 10629: "Raw Optical Glass—Resistance to Attack . . ." First Edition, Jul. 1, 1996.

* cited by examiner

*Primary Examiner* — Karl Group
(74) *Attorney, Agent, or Firm* — Michael J. Striker

(57) ABSTRACT

The lead- and arsenic-free optical glass has a refractive index nd of $1.55 \leq nd \leq 1.64$, an Abbe number vd of $42 \leq vd \leq 65$, and a low transition temperature $Tg \leq 460°$ C., good producibility and processability, and crystallization stability. The optical glass has a composition within the following range, in wt. % based on oxide content:

| | |
|---|---|
| $P_2O_5$ | 40-58 |
| $ZnO$ | 20-34 |
| $Li_2O$ | 0.5-5 |
| $GeO_2$ | 0.1-11 |

The glass may also have a total content of $SiO_2$, $B_2O_3$ and $Al_2O_3$ that is less than 9 wt. %. The glass may contain MgO, SrO, CaO and BaO, but the sum of these oxides is preferably at least 2 wt. % and at most 12 wt. %. The glass may contain at most 5 wt. % of each of $La_2O_3$, $TiO_2$, $Nb_2O_5$, at most 2 wt. % $Ta_2O_5$ and less than 1 wt. % fluorine.

16 Claims, No Drawings

OPTICAL GLASS, METHOD OF MAKING THE OPTICAL GLASS, OPTICAL ELEMENTS MADE WITH THE OPTICAL GLASS AND USES THEREOF

CROSS-REFERENCE

The invention described and claimed herein below is also described in German Patent Application 10 2009 011 508.0, filed Mar. 6, 2009 in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The present invention relates to an optical glass, to the use of such a glass, to optical elements or preforms of such optical elements, to a method for producing such optical elements and to optical parts or optical components made of such optical elements.

2. The Related Art

In recent years, the market trend for both optical and optoelectronic technologies in the application fields of imaging, projection, telecommunication, optical communications engineering and laser technology has increasingly been tending towards miniaturization. This can be seen from the end products, and it also requires ever smaller dimensions for the individual parts and components.

For the producers of optical glasses, this firstly means a significant reduction of the material volumes ordered, despite increased production numbers. Furthermore, there is an increasing cost pressure on the pail of the manufacturers for whom much more waste is incurred as a percentage in relation to the product when producing much smaller component sizes from block or ingot glass, and the processing of such small pieces furthermore often entails greatly increased outlay.

For these reasons, there are increasing demands from manufacturers for blank-pressed small components and therefore, as their precursors, also for preforms close to final geometry for re-pressing, so-called "precision gobs". These precision gobs are fully fire-polished, semifree- or free-formed glass portions which can be produced in various ways.

One production method for gobs is the pearl spraying method. No controlled positioning is required in this method; instead, the required size fraction is separated for example by screening. The residual fraction does not need to be discarded, but can be reused as highly pure cullet which can be re-melted particularly well. Furthermore, with this method which is particularly easy to carry out in terms of technology and staff, large batch numbers are achieved within a short time.

In contrast to this, direct pressing close to final geometry, on which greater value is to be placed in the supply chain, entails the problem of economic viability. Although this method can flexibly compensate for the small glass melt volumes, distributed over a large batch number of small material pieces, by short setting up times, with small geometries the value creation cannot however come only from the material value because of the lower cycle time/batch number in comparison with gob spraying. The products must leave the press in a state which is ready for system incorporation ("ready-to-clamp") without requiring elaborate adjustment, cooling and/or cold reprocessing. For this reason, owing to the high geometrical accuracies required, it is necessary to use precision equipment with high-quality and therefore expensive mold materials. The service lives of the molds make a huge impact on the economic viability of the products or materials. One extremely important factor when considering the service lives is the operating temperature, which is dictated here by the viscosity of the materials to be pressed. For glass, this means that the lower the transition temperature $T_g$ is, the longer the mold service lives are when pressing this glass and therefore the greater the profit margin is. This explains the glass producers' demand for so-called "low-Tg glasses", i.e. glasses that can be processed at temperatures which are as low as possible.

In addition, melt process technology has recently reported more demand for "short" glasses, i.e. for glasses whose viscosity varies greatly with temperature. For processing, this behavior has the advantage that the hot forming times, i.e. the mold closure times, can be reduced. In this way, on the one hand the throughput is increased (cycle time reduction), and on the other hand it conserves the mold material, which has an extremely positive impact on the overall production costs. Owing to the more rapid cooling which this allows, it also makes it possible to process glasses with a greater susceptibility to crystallization than in the case of correspondingly longer glasses, and it avoids prenucleation which could be problematic in subsequent secondary hot forming steps. As a result, this in turn means that these materials are also very suitable for rod, tube and fiber production, besides gob production and direct pressing from the melt.

Besides these properties, which are important for hot forming, such glasses must furthermore have good properties for cold reprocessing so that they can be sold viably on the world market, since as before some of the material is processed in the conventional way by cutting, grinding and polishing, particularly for parts and components with sizeable geometries or dimensions. To this end, the glasses must have a sufficiently good chemical stability or chemical resistance. If this were not the case, grinding or polishing agents and contact with the predominantly aqueous media of the cleaning baths would damage the very precisely processed surfaces. Scratches, efflorescences and discolorations would occur. Moderate thermal expansion values are likewise required, which ensure that stress cracks or strained materials are not produced in processing steps with intense thermal shocks. The hardness (here: Knoop hardness) should also not be too great, in order to keep machine processing times within viable limits.

The prior art relevant to the invention is summarized in the following documents:

| | |
|---|---|
| DE 10 2005 005 994 | Schott |
| DE 10 239572 | Schott |
| JP 2 124 743A | Sumita |
| US 2004 0 138 043 | Hoya |
| DE 1 089 934 | Schott |
| JP 60 171 244A | Ohara |
| JP 63 011 544A | Hoya |
| US 5 022 921 | Corning |
| JP 2007 070 194 | Ohara |
| JP 9 278 479A | Ohara |

According to these, although glasses can be produced with a similar optical position and/or roughly comparable chemical composition, these glasses nevertheless exhibit considerable disadvantages in comparison with the glasses according to the invention.

DE 10 2005 005 994 describes glasses with a comparable optical position. These, however, are glasses of the aluminoborosilicate glass system with a different physicochemical property profile. Owing to the high proportion of conventional glass-forming substances (sum of $SiO_2$, $B_2O_3$, $Al_2O_3$ 50-71 wt. %) and the absence of phosphate, in spite of their very high alkaline earth metal oxide content the glasses exhibit glass transition temperatures of about 500° C., the lowest Tg referred to by way of example being 470° C.

DE 10 239 572 describes lithium oxide- and germanate-free zinc phosphate glasses with a comparable optical position. The Tgs lie in the same range of around 400° C., which is suitable for hot forming processes close to final geometry (for example blank pressing). Owing to the absence of $GeO_2$ which stabilizes the matrix, however, these glasses have only a very low acid resistance.

The glasses disclosed in JP 2 124 743A have the same disadvantage. Owing to the lack of a germanate component, they had an inferior acid resistance class compared with the glasses according to the invention, and are therefore less suitable for further mechanical processing.

The glasses disclosed in US 2004/0138043 also have corresponding disadvantages. Without germanate the acid resistance class is too low, and the use of all alkali metal oxides in parallel, probably aiming to achieve the mixed alkali effect known from silicate systems, leads to an increased turbidity risk in comparison with the glasses according to the invention. Owing to the $Bi_2O_3$ content of at least 0.5 mol %, the described glasses furthermore lose transmission at the blue edge and contain a highly redox-sensitive component which leads to great outlay in the production process.

The glasses disclosed in JP 9 278 479A and U.S. Pat. No. 5,022,921 also contain no germanate. Both documents use conventional glass-forming substances, for example $Al_2O_3$, or hardness-increasing components, for example $La_2O_3$, to improve the chemical resistance, although these either (in the case of glass-forming substances) provide no improvement corresponding to the resistance stabilization of the glasses according to the invention or (in the case of hardness-increasing components) reduce the crystallization stability of the glasses owing to network modification without stabilization by $GeO_2$.

The same also applies to the glasses described in JP 2007-070 194 and JP 63-011 544, all the more so since these are not zinc-phosphate glasses but alkaline earth metal aluminophosphate glasses, the viscosity-temperature profile of which is less suited to the requirements of precision hot forming, i.e. the glasses are longer.

DE 1 089 934 and JP 60-171 244 A describe germanate-free glasses of the borophosphate glass system with an intrinsically much higher Tg. Although these have a good chemical resistance, owing to their not correspondingly optimized viscosity-temperature profile they are unsuitable for processing in precision hot forming methods.

SUMMARY OF THE INVENTION

It is therefore an object of the present invention to provide a composition range for short optical glasses which permits the desired optical properties ($n_d/v_d$) with very low transition temperatures, as far as possible without using PbO and $As_2O_3$ owing to ecological considerations. The glasses according to the invention should have optical data in common with known optical glasses of similar glass families. They should, however, be distinguished by good meltability and flexible processability close to final geometry, low production costs due to reduced process costs, sufficient crystallization stability due to their shortness, and by good environmental compatibility. They should furthermore have sufficiently improved chemical resistances, moderate thermal expansion values and low Knoop hardnesses.

The said object is achieved by the embodiments described in the claims.

In particular, an optical glass is provided which comprises the following composition (in wt. % based on oxide):

| | |
|---|---|
| $P_2O_5$ | 45-58 |
| ZnO | 25-34 |
| $Li_2O$ | 0.5-5 |
| $GeO_2$ | 0.1-11. |

The glasses according to the invention preferably have a refractive index $n_d$ of at least 1.55, more preferably at least 1.56 and/or a refractive index $n_d$ of at most 1.64, more preferably at most 1.63. The Abbe number $v_d$ of the glasses according to the invention is preferably at least 42, more preferably at least 43 and/or preferably at most 65, more preferably at most 64.

According to one embodiment, the glasses according to the invention are as far as possible "short" in a viscosity range of from $10^{7.6}$ to $10^{13}$ dPas. "Short glasses" are intended to mean glasses whose viscosity varies greatly with a relatively small temperature change in a particular viscosity range. The temperature interval $\Delta T$, in which the viscosity of this glass decreases from $10^{7.6}$ to $10^{13}$ dPas, is preferably at most 100 K.

In what follows, the expressions "X-free", "free of a component X" or "contains no X" mean that the glass essentially does not contain this component X, i.e. such a component is present at most as an impurity in the glass but is not added as a separate component to the glass composition.

The improved chemical resistance in the glasses according to the invention significantly facilitates cold mechanical reprocessability and cleaning, and for the first time makes it possible to use particularly effective but aggressive grinding, polishing and cleaning media.

The basic glass system is the zinc phosphate system, which forms a good basis for the desired properties.

The glasses according to the invention contain a high phosphate content of from 40 to 58 wt. %, preferably at least 45 wt. %, particularly preferably at least 46 wt. %, so that readily melting low-Tg glasses are obtained. The phosphate content is preferably limited to at most 56 wt. %. Reducing the phosphate content to below 40 wt. % would lead to glasses which could no longer be termed "low-Tg". A further increase to above 58 wt. % furthermore leads on the one hand to insufficient refractive indices, and on the other hand to uncontrollability in the melting method since the proportion of complex phosphates would then necessarily be reduced in favor of free $P_2O_5$. Free phosphate causes significantly increased evaporation and atomization effects, which lead to an inferior internal quality. Since both storage and raw material procurement of free $P_2O_5$ are more elaborate than for complex phosphates, owing to occupational safety aspects (explosive potential, toxicity, hygroscopicity), the use of free phosphate should be minimized as far as possible. In addition, an increased proportion of free phosphate entails greater requirements for safety technology of the production operation.

The glasses according to the invention have a high zinc oxide content of from 20 to 34 wt. %, preferably at least 25 wt. %, particularly preferably at least 26 wt. % and/or preferably at most 31 wt. %, more preferably at most 30 wt. %. In comparison with pure aluminum or barium phosphates, owing to the high zinc oxide content the glasses according to the invention exhibit the desired viscosity-temperature behavior, i.e. the desired shortness of the glass. The high level of zinc addition also offers the advantage that large proportions of the amount of phosphate required in order to set the low Tg can be introduced in complex form as zinc phosphate. The performance in the melting process is thereby improved, since the susceptibilities of the charge to evaporation and atomization are drastically reduced. Significantly improved homogeneities are thus achieved, which are reflected particularly in the quality/homogeneity of the optical properties, but also generally in the improved internal quality of the glass, i.e. the occurrence of for example bubbles and/or streaks, even though the glass would otherwise be very susceptible to streaks owing to its shortness. If the zinc oxide content were reduced to below 20 wt. %, the regulating properties with respect to the shortness of the glasses would no longer make a sufficient contribution. The phosphate content that can be introduced via zinc phosphates would furthermore be reduced, which would lead to the degradations of internal quality as discussed above. Increasing the zinc oxide content to above 34 wt. %, on the other hand, would lead to "short" glasses which cannot be controlled in conventional hot forming processes and would also excessively increase the susceptibility of the glasses according to the invention to crystallization.

In contrast to known zinc phosphate glasses with this optical position, the glasses according to the invention always contain $GeO_2$ and $Li_2O$.

The glass according to the invention contains $GeO_2$ in a proportion of from 0.1 to 11 wt. %, preferably in a proportion of more than 0.5 wt. %, more preferably at least 1 wt. % and/or in a proportion of at most 10 wt. %. Surprisingly, this component is integrated very well into the phosphate glass matrix, which is otherwise very intolerant with respect to glass-forming substances, and contrary to expectations it has led to stabilization of the network as regards crystallization in primary and secondary hot forming steps. It has furthermore been found that the resistance of the glass to chemical attacks (acid and base resistance (SR/AR)) is improved by germanate, without thereby detrimentally affecting the mechanical processing properties (for example the Knoop hardness $H_K$), as $SiO_2$ is known to do. $GeO_2$ contents increased beyond the proportion according to the invention, however, would modify too greatly the phosphate network optimal for low-Tg glasses and, besides increased hot processing temperatures, would entail disadvantages in mechanical processability due to increased hardness. Furthermore, highly refractive $GeO_2$ would shift the optical position to excessively high refractive index values with too much dispersion i.e. a low Abbe number.

$Li_2O$ in a proportion of from 0.5 to 5 wt. %, preferably less than 5 wt. %, more preferably at most 4 wt. % and/or preferably at least 1 wt. % is used in the glass according to the invention as a conventional flux and, besides optimization of the melting behavior, leads to shortening of the glass so as to simplify hot forming close to final geometry, for example blank pressing. In contrast to the other alkali metal oxides $Na_2O$, $K_2O$ and $Cs_2O$, in the zinc phosphate matrix $Li_2O$ surprisingly does not lead to a reduction of the internal quality of the glass, and in particular not to turbidity phenomena due to very small crystallites. This is surprising since in other glasses, when melting in platinum crucibles and tanks, $Li_2O$ leads more often than other alkali metal oxides to turbidity, on the one hand due to platinum particles and on the other hand due to crystallites growing on these platinum particles which act as heterogeneous seeds. The proportion of $Li_2O$ should nevertheless not exceed the upper limit of 5 wt. %, since otherwise the very strong fluxing nature, i.e. perturbation of the zinc phosphate lattice, would reduce not only the Tg but also the chemical resistance (SR/AR) and the Knoop hardness, and therefore degrade the reprocessability.

The glass according to the invention preferably contains none of the other alkali metals $Na_2O$, $K_2O$ and $Cs_2O$, since in contrast to $Li_2O$ they lead to an increased turbidity risk.

The glasses according to the invention may furthermore optionally contain small proportions of the conventional glass-forming substances $SiO_2$, $B_2O_3$ and/or $Al_2O_3$. Owing to the strongly networking properties of these components, the stability of the glasses against crystallization and/or chemical attack can be increased. $Al_2O_3$ also acts as a supplementary carrier of complex phosphate and thereby stabilizes the production process. However, the total proportion ($SiO_2+B_2O_3+Al_2O_3$) of these components should be at most 9 wt. % because a higher proportion would increase the Tg too much, since the network would be solidified and the melting point would be increased. The glasses would then also become undesirably "longer". Particular embodiments of the glass according to the invention contained in total less than 9 wt. %, more preferably at most 7 wt. % or are even free of these components.

$SiO_2$ is preferably contained in a proportion of at most 5 wt. %, more preferably at most 3 wt. %. Since in particular $SiO_2$ is not accepted well in the zinc phosphate system and it promotes the susceptibility to crystallization, by increasing the silicate solubility, more strongly than it stabilizes the network, particularly preferred embodiments of the glass according to the invention are free of $SiO_2$.

$B_2O_3$ is preferably contained in a proportion of at most 5 wt. %, more preferably less than 5 wt. %.

$Al_2O_3$ is preferably contained in a proportion of at most 5 wt. %, more preferably at most 3 wt. %.

In a relatively small proportion, the glass according to the invention may furthermore contain $La_2O_3$, $ZrO_2$, $Nb_2O_5$ and/or $Ta_2O_5$, which further improve the chemical resistance of the glass. However, since these components also have a strong nucleation effect, their total proportion is preferably limited to a proportion of at most 9 wt. %. Higher proportions of these components would furthermore shift the optical position of the glass according to the invention towards higher refractive indices. $La_2O_3$, $TiO_2$ and/or $Nb_2O_5$ are limited to a proportion of at most 5 wt. % each. $Ta_2O_5$ is preferably limited to a proportion of at most 2 wt. %, since this component is also expensive. The glass according to the invention preferably contains no $ZrO_2$, since this component acts as a particularly strong nucleation agent in zinc phosphate systems.

For flexible regulation of the viscosity-temperature behavior and further formation of phosphate equivalents, the glass according to the invention may contain at most 10 wt. % BaO, preferably at most 8 wt. %, particularly preferably at most 5 wt. %.

The glass according to the invention may furthermore contain at most 5 wt. % CaO, preferably less than 5 wt. %.

The total content of BaO+CaO is preferably at least 2 wt. % and/or preferably at most 12 wt. %, more preferably at most 10 wt. %. With a higher total content, the glasses according to the invention would be too highly refractive for the desired optical position. Furthermore, higher contents would lead to such short glasses that they would be uncontrollable in conventional hot forming processes.

The glass according to the invention may also contain the further alkaline earth metals MgO and/or SrO in a proportion of preferably at most 3 wt. %, for further fine adjustment of the viscosity-temperature profile.

The total content of components in the group alkaline earth metal oxides MO and zinc oxide (MO+ZnO) is preferably more than 30 wt. %, in order to be able to introduce a sufficiently large proportion of the phosphate into the melt as complex phosphate. The total content of MO+ZnO is however preferably limited to at most 45 wt. %, since otherwise the proportion of components which improve the chemical resistance, networking components and/or hardness-increasing components could not be selected at a sufficiently high level.

The glasses according to the invention may contain a fluoride content of at most 1 wt. %, preferably less than 1 wt. %. This can be used for fine adjustment of the optical position towards lower refractive indices and dispersion. As a flux, it furthermore influences the viscosity-temperature profile. Fluoride raw materials or charges containing fluoride, however, may only be handled with more elaborate occupational safety measures and detrimentally affect the stability of a continuous melting process by evaporation and atomization effects. The use of higher fluoride contents is therefore avoided in the glasses according to the invention, and particularly preferred embodiments are free of fluoride. As explained below, fluoride can also be used as a physical fining agent, i.e. by heating in the fining chamber it can release gases which serve to remove bubbles from the glass. Higher temperatures in the fining chamber are required for the effect as a fining agent. If fluoride is being used for fine adjustment of the optical position, care should be taken to fine the glass at relatively low temperatures so that fluoride remains in the glass and does not escape as a gaseous component. According to such an embodiment of the invention, it is preferable to use inorganic peroxides as fining agents since they already exhibit a sufficient fining effect at relatively low temperatures.

As an optical glass, the glass according to the invention is preferably also free of coloring and/or optically active e.g. laser-active components.

According to another embodiment of the present invention, as the base glass of an optical filter or solid-state laser, the glass according to the invention may contain coloring and/or optically active e.g. laser-active components in contents of up to at most 5 wL %, in which case these amounts are provided in addition to the other components of the glass composition which add up to 100 wt. %.

According to one embodiment of the present invention, at least 90 wt. %, more preferably at least 95 wt. % of the glass according to the invention consists of the components mentioned above.

According to another embodiment of the present invention, the glass according to the invention is also free of other components not mentioned above, i.e. according to such an embodiment of the glass consists essentially of the components mentioned above. The expression "consist essentially of" means that other components are present at most as impurities, but are not intentionally added as a separate component to the glass composition.

The glass according to the invention may contain conventional fining agents in small amounts. The sum of the fining agents added is preferably at most 2.0 wt. %, more preferably at most 1.0 wt. %, in which case these amounts are provided in addition to the other components of the glass composition which add up to 100 wt. %. The glass according to the invention may contain at least one of the following components as a fining agent (in wt. %, in addition to the rest of the glass composition):

| | |
|---|---|
| $Sb_2O_3$ | 0-1 and/or |
| SnO | 0-1 and/or |
| $SO_4^{2-}$ | 0-1 and/or |
| NaCl | 0-1 and/or |
| $As_2O_3$ | 0-1 and/or |
| $F^-$ | 0-1 and/or |
| inorganic peroxides | 0-1 |

Zinc peroxide, lithium peroxide and/or alkaline earth metal peroxides may for example be used as inorganic peroxides.

According to a preferred embodiment of the present invention, however, the $As_2O_3$ content is at most 0.1 wt. % or the glass is $As_2O_3$-free, since this component is regarded as problematic for ecological reasons.

All the glasses according to the invention furthermore have good chemical resistance and stability against crystallization, or crystallization stability. They are furthermore distinguished by good meltability and flexible processability close to final geometry, low production costs due to reduced process costs, good ion exchange properties, good solarization stability, and by good environmental compatibility.

The glasses according to the invention have a Tg of less than or equal to 500° C., preferably at most 480° C.

The glass according to the invention has good chemical resistance. In particular, it may have an acid resistance SR of less than class 52.3 according to ISO 8424 and/or an alkali resistance of less than 4.3 according to ISO 10629.

The glasses according to the invention have negative anomalous relative partial dispersions $\Delta P_{g,F}$ of from 0 to $110 \times 10^{-4}$ on measurement samples from cooling with a cooling rate of about 7 K/h.

The glasses according to the invention have thermal expansion coefficients $\alpha_{20-300}$ of at most $11 \times 10^{-6}$/K, more preferably at most $10 \times 10^{-6}$/K. Problems with thermal stress in further processing and assembly technology are therefore avoided.

The glasses according to the invention have specific densities of less than or equal to 4.0 g/cm³. Owing to their low carrying mass as considered relative to pendants containing lead, the optical elements and/or optical components made from them are therefore particularly suitable for mobile/portable units.

By virtue of the glasses according to the invention, an adjustment of optical position, viscosity-temperature profile and processing temperatures has been achieved such that highly specified hot forming close to final geometry is ensured even with sensitive precision machines. A correlation of crystallization stability and viscosity-temperature profile has furthermore been achieved so that further thermal processing of the glasses is readily possible, for instance pressing or re-pressing, or ion exchange processes.

The present invention furthermore relates to the use of the glasses according to the invention for the application fields of imaging, sensors, microscopy, medical technology, digital projection, telecommunication, optical communications engineering/information transmission, optics/lighting in the automotive sector, photolithography, steppers, excimer lasers, wafers, computer chips and integrated circuits and electronic devices which contain such circuits and chips.

The present invention furthermore relates to optical elements which comprise the glass according to the invention. The optical elements may in particular be lenses, prisms, light guide rods, arrays, optical fibers, gradient components, optical windows and compact components. The term "optical element" according to the invention also covers semi-finished parts or preforms of such an optical element, for example gobs, precision gobs and the like.

The invention furthermore relates to a method for producing an optical element, comprising the step:

blank pressing the optical glass according to the invention.

The invention furthermore relates to the use of such an optical element to produce optical parts or optical components, for example for sensors, microscopy, medical technology, digital projection, telecommunication, optical communications engineering/information transmission, optics/lighting in the automotive sector, photolithography, steppers, excimer lasers, wafers, computer chips and integrated circuits and electronic devices which contain such circuits and chips.

The invention furthermore relates to optical parts or optical components, for example for imaging, sensors, microscopy, medical technology, digital projection, telecommunication, optical communications engineering/information transmission, optics/lighting in the automotive sector, photolithography, steppers, excimer lasers, wafers, computer chips and integrated circuits and electronic devices which contain such circuits and chips comprising optical elements as mentioned above.

EXAMPLES

The glasses according to the invention are produced as follows: the raw materials for the oxides, preferably phosphates, but also carbonates, nitrates and/or fluorides, as well as pure oxides, preferably water-free or low-water raw materials, and the phosphate component, preferably as complex phosphates, are weighed out, one or more fining agents are optionally added, for example $Sb_2O_3$, and these are subsequently mixed well. The glass charge is melted at about 1050° C. in batch melting apparatus, then oxidizing conditions are set up by feeding in oxygen, and fining and homogenization are carried out at 1100° C. With a casting temperature of about 800° C., the glass can be cast and processed to the desired dimensions. In large-volume continuous apparatus, according to experience the temperatures can be reduced by about 50 to 100° C. and the material can be processed in a direct pressing method close to final geometry at about 650° C.

Melt example for glass calculated to 100 kg (Table I)

| Oxide | wt. % | Raw material | Weigh-in (kg) |
|---|---|---|---|
| $P_2O_5$ | 52.5 | $P_2O_5$ | 31.43 |
| ZnO | 30.0 | $Zn_3(PO_4)_2$ | 52.35 |
| $GeO_2$ | 5.0 | $GeO_2$ | 5.00 |
| $Li_2O$ | 1.5 | $Li_2CO_3$ | 3.48 |
| CaO | 2.0 | $CaCO_3$ | 3.72 |
| BaO | 5.0 | $Ba(H_2PO_4)_2$ | 11.14 |
| $Nb_2O_5$ | 4.0 | $Nb_2O_5$ | 3.91 |
| Sum | 100.0 |  | 111.03 |

The properties of the glass obtained in this way are specified in Table IV, example 10.

TABLE II

Melt examples (in wt. % based on oxide)

|  | Comp-Ex 1 | Comp-Ex 2 | Ex. 1 | Ex. 2 | Ex. 3 |
|---|---|---|---|---|---|
| $SiO_2$ | 43.0 |  |  |  |  |
| $B_2O_3$ | 15.0 |  |  |  |  |
| $Al_2O_3$ | 4.2 | 1.9 | 2.0 | 2.0 | 2.5 |
| $P_2O_5$ |  | 49.8 | 55.4 | 54.9 | 53.4 |
| $GeO_2$ |  |  | 0.1 | 0.1 | 0.1 |
| $Li_2O$ | 6.3 |  | 2.0 | 2.0 | 2.0 |
| $Na_2O$ | 2.7 | 9.8 |  |  |  |
| MgO |  |  |  |  |  |
| CaO |  | 2.0 | 2.0 | 2.0 | 2.0 |
| BaO | 24.4 | 7.3 | 7.5 | 7.5 | 8.0 |
| SrO | 0.7 |  |  |  |  |
| ZnO | 3.5 | 27.2 | 28.5 | 28.0 | 29.5 |
| $La_2O_3$ |  | 2.0 | 2.5 | 3.5 | 2.5 |
| $TiO_2$ | 0.2 |  |  |  |  |
| $Nb_2O_5$ |  |  |  |  |  |
| $Ta_2O_5$ |  |  |  |  |  |
| $Sb_2O_3$ | 0.3 |  |  |  |  |
| Sum | 100.3 | 100.0 | 100.0 | 100.0 | 100.0 |
| $n_d$ | 1.5867 | 1.5730 | 1.5807 | 1.5823 | 1.5865 |
| $v_d$ | 59.7 | 60.7 | 61.9 | 61.8 | 61.6 |
| $P_{g,F}$ | 0.5412 | 0.5452 | 0.5422 | 0.5419 | 0.5427 |
| $\Delta P_{g,F}(10^{-4})$ | −22 | 34 | 24 | 20 | 25 |
| $\alpha_{20-300}$ $(10^{-6} * K^{-1})$ | 8.9 | 12.6 | 9.7 | 9.6 | 9.8 |
| Tg (° C.) | 496 | 373 | 367 | 371 | 372 |
| $\rho$ (g/cm$^3$) | 3.01 | 3.26 | 3.22 | 3.23 | 3.27 |
| AR [class] | 2.3 | 4.3 |  |  | 4.3 |
| SR [class] | 52.3 | 53.3 |  |  | 52.3 |

TABLE III

Melt examples (in wt. % based on oxide)

|  | Ex. 4 | Ex. 5 | Ex. 6 | Ex. 7 | Ex. 8 | Ex. 9 |
|---|---|---|---|---|---|---|
| $SiO_2$ |  |  |  | 5.0 |  | 4.0 |
| $B_2O_3$ |  |  |  |  | 5.0 | 5.0 |
| $Al_2O_3$ | 2.5 | 2.5 | 5.0 |  |  |  |
| $P_2O_5$ | 52.4 | 52.4 | 52.4 | 52.4 | 52.4 | 52.4 |
| $GeO_2$ | 0.1 | 0.1 | 0.1 | 0.1 | 0.1 | 0.1 |
| $Li_2O$ | 2.0 | 1.5 | 1.5 | 1.5 | 1.5 | 1.5 |
| $Na_2O$ |  |  |  |  |  |  |
| MgO |  |  |  |  |  |  |
| CaO | 2.0 | 2.0 | 2.0 | 2.0 | 2.0 | 2.0 |
| BaO | 8.0 | 8.5 | 9.0 | 5.0 | 5.0 | 5.0 |
| SrO |  |  |  |  |  |  |

TABLE III-continued

Melt examples (in wt. % based on oxide)

| | Ex. 4 | Ex. 5 | Ex. 6 | Ex. 7 | Ex. 8 | Ex. 9 |
|---|---|---|---|---|---|---|
| ZnO | 30.5 | 30.5 | 30.0 | 30.0 | 30.0 | 30.0 |
| $La_2O_3$ | 2.5 | 2.5 | | | | |
| $TiO_2$ | | | | 4.0 | 4.0 | |
| $Nb_2O_5$ | | | | | | |
| $Ta_2O_5$ | | | | | | |
| $Sb_2O_3$ | | | 0.3 | | | |
| Sum | 100.0 | 100.0 | 100.3 | 100.0 | 100.0 | 100.0 |
| $n_d$ | 1.5914 | 1.5882 | 1.5801 | 1.5974 | 1.6139 | 1.5666 |
| $v_d$ | 61.2 | 61.3 | 61.8 | 46.0 | 46.5 | 62.8 |
| $P_{g,F}$ | 0.5433 | 0.5428 | 0.5425 | 0.5758 | 0.5736 | 0.5391 |
| $\Delta P_{g,F} (10^{-4})$ | 25 | 21 | 27 | 93 | 81 | 10 |
| $\alpha_{20-300} (10^{-6} * K^{-1})$ | 9.7 | 9.2 | 8.8 | 8.3 | 8.1 | 8.7 |
| Tg (°C.) | 376 | 383 | 396 | 479 | 414 | 383 |
| $\rho$ (g/cm³) | 3.32 | 3.30 | 3.24 | 3.11 | 3.19 | 3.08 |
| AR [class] | 4.3 | 4.3 | 4.3 | 4.3 | 3.3 | 4.3 |
| SR [class] | 52.3 | 52.3 | 52.3 | 52.3 | 5.3 | 52.3 |

TABLE IV

Melt examples (in wt. % based on oxide)

| | Ex. 10 | Ex. 11 | Ex. 12 | Ex. 13 | Ex. 14 | Ex. 15 |
|---|---|---|---|---|---|---|
| $SiO_2$ | | | | | | |
| $B_2O_3$ | | | | | | |
| $Al_2O_3$ | | | | 4.0 | | 4.0 |
| $P_2O_5$ | 52.5 | 52.5 | 52.4 | 52.4 | 52.4 | 52.4 |
| $GeO_2$ | 5.0 | 4.0 | 0.1 | 0.1 | 0.1 | 0.1 |
| $Li_2O$ | 1.5 | 1.5 | 1.5 | 1.5 | 1.5 | 1.5 |
| $Na_2O$ | | | | | | |
| MgO | | | | | | |
| CaO | 2.0 | 2.0 | 2.0 | 2.0 | 2.0 | 2.0 |
| BaO | 5.0 | 10.0 | 10.0 | 5.0 | 9.0 | 5.0 |
| SrO | | | | | | |
| ZnO | 30.0 | 30.0 | 30.0 | 30.0 | 30.0 | 30.0 |
| $La_2O_3$ | | | | 5.0 | 5.0 | |
| $TiO_2$ | | | | | | 5.0 |
| $Nb_2O_5$ | 4.0 | | 4.0 | | | |
| $Ta_2O_5$ | | | | | | |
| $Sb_2O_3$ | | | | | 0.3 | |
| Sum | 100.0 | 100.0 | 100.0 | 100.0 | 100.3 | 100.0 |
| $n_d$ | 1.6033 | 1.5892 | 1.5982 | 1.5859 | 1.5910 | 1.6194 |
| $v_d$ | 53.3 | 61.0 | 53.5 | 61.1 | 60.7 | 43.0 |
| $P_{g,F}$ | 0.5562 | 0.5436 | 0.5562 | 0.5427 | 0.5439 | 0.5825 |
| $\Delta P_{g,F} (10^{-4})$ | 19 | 24 | 23 | 17 | 22 | 110 |
| $\alpha_{20-300} (10^{-6} * K^{-1})$ | 8.4 | 9.6 | 9.4 | 8.6 | 9.8 | 7.8 |
| Tg (°C.) | 391 | 371 | 366 | 392 | 371 | 411 |
| $\rho$ (g/cm³) | 3.29 | 3.33 | 3.29 | 3.27 | 3.35 | 3.20 |
| AR [class] | 3.3 | 4.3 | 4.3 | 4.3 | 4.3 | 3.3 |
| SR [class] | 51.3 | 52.3 | 52.3 | 52.3 | 52.3 | 5.3 |

TABLE V

Melt examples (in wt. % based on oxide)

| | Ex. 16 | Ex. 17 | Ex. 18 | Ex. 19 | Ex. 20 | Ex. 21 |
|---|---|---|---|---|---|---|
| $SiO_2$ | | | | 1.0 | | |
| $B_2O_3$ | | 1.0 | 0.2 | 0.5 | 3.5 | 3.5 |
| $Al_2O_3$ | | 1.0 | 0.3 | 0.5 | 4.5 | 4.5 |
| $P_2O_5$ | 52.4 | 52.5 | 52.5 | 52.5 | 53.5 | 52.5 |
| $GeO_2$ | 0.1 | 5.0 | 5.0 | 5.0 | 3.0 | 3.0 |
| $Li_2O$ | 1.5 | 1.5 | 1.5 | 1.5 | 1.5 | 1.5 |
| $Na_2O$ | | | | | | |
| MgO | | | | | | |

TABLE V-continued

| Melt examples (in wt. % based on oxide) | | | | | | |
|---|---|---|---|---|---|---|
| | Ex. 16 | Ex. 17 | Ex. 18 | Ex. 19 | Ex. 20 | Ex. 21 |
| CaO | 2.0 | 2.0 | 2.0 | 2.0 | 2.0 | 2.0 |
| BaO | 5.0 | 5.0 | 5.0 | 5.0 | | |
| SrO | | | | | | |
| ZnO | 30.0 | 30.0 | 30.0 | 30.0 | 29.0 | 30.0 |
| $La_2O_3$ | 4.0 | 2.0 | | 2.0 | 0.5 | 0.5 |
| $TiO_2$ | | | | | | |
| $Nb_2O_5$ | 5.0 | | 3.5 | | 2.5 | 2.5 |
| $Ta_2O_5$ | | | | | | |
| $Sb_2O_3$ | | 0.3 | | | | |
| Sum | 100.0 | 100.3 | 100.0 | 100.0 | 100.0 | 100.0 |
| $n_d$ | 1.6065 | 1.5894 | 1.6008 | 1.5851 | 1.5784 | 1.5815 |
| $v_d$ | 51.3 | 61.0 | 54.1 | 61.0 | 57.3 | 57.1 |
| $P_{g,F}$ | 0.5591 | 0.5424 | 0.5543 | 0.5432 | 0.5475 | 0.5478 |
| $\Delta P_{g,F}$ ($10^{-4}$) | 15 | 12 | 15 | 19 | 1 | 0 |
| $\alpha_{20-300}$ ($10^{-6} \ast K^{-1}$) | 8.7 | 8.6 | 8.4 | 8.7 | 7.3 | 7.2 |
| Tg (° C.) | 377 | 400 | 393 | 392 | 413 | 413 |
| ρ (g/cm³) | 3.29 | 3.29 | 3.28 | 3.26 | 3.08 | 3.10 |
| AR [class] | 3.3 | 4.3 | 3.3 | 4.3 | 4.3 | 4.3 |
| SR [class] | 51.3 | 51.3 | 51.3 | 52.3 | 51.3 | 51.3 |

TABLE VI

| Melt examples (in wt. % based on oxide) | | | | | | |
|---|---|---|---|---|---|---|
| | Ex. 22 | Ex. 23 | Ex. 24 | Ex. 25 | Ex. 26 | Ex. 27 |
| $SiO_2$ | | | | | 3.0 | |
| $B_2O_3$ | 4.0 | | 3.0 | | 2.0 | |
| $Al_2O_3$ | | | | | 1.0 | |
| $P_2O_5$ | 45.0 | 48.0 | 46.0 | 57.0 | 47.0 | 56.0 |
| $GeO_2$ | 11.0 | 10.0 | 9.0 | 8.0 | 7.0 | 6.0 |
| $Li_2O$ | 5.0 | 0.5 | 1.5 | 0.5 | 1.0 | 3.0 |
| $Na_2O$ | | | | | | |
| MgO | 1.0 | | 0.5 | 2.5 | | 1.0 |
| CaO | | | 1.0 | | 3.0 | 4.0 |
| BaO | 4.0 | 2.0 | | 3.0 | 2.0 | |
| SrO | 1.0 | 2.0 | 3.0 | | | 2.0 |
| ZnO | 27.0 | 31.0 | 27.0 | 28.0 | 29.0 | 26.0 |
| $La_2O_3$ | 1.0 | | 3.0 | | | 2.0 |
| $TiO_2$ | 1.0 | | 4.0 | | 2.0 | |
| $Nb_2O_5$ | | 4.5 | 2.0 | 1.0 | 2.0 | |
| $Ta_2O_5$ | | 2.0 | | | 1.0 | |
| $Sb_2O_3$ | 0.3 | | | 0.3 | | |
| Sum | 100.3 | 100.0 | 100.0 | 100.3 | 100.0 | 100.0 |
| $n_d$ | 1.6055 | 1.6141 | 1.6263 | 1.5840 | 1.5992 | 1.5853 |
| $v_d$ | 63.9 | 47.5 | 43.0 | 55.3 | 48.5 | 59.6 |
| $P_{g,F}$ | 0.5382 | 0.5644 | 0.5780 | 0.5518 | 0.5661 | 0.5452 |
| $\Delta P_{g,F}$ ($10^{-4}$) | 31 | 3 | 69 | 1 | 38 | 17 |
| $\alpha_{20-300}$ ($10^{-6} \ast K^{-1}$) | 10.5 | 6.5 | 6.7 | 7.4 | 6.7 | 9.3 |
| Tg (° C.) | 348 | 432 | 447 | 418 | 460 | 385 |
| ρ (g/cm³) | 3.41 | 3.32 | 3.25 | 3.12 | 3.16 | 3.16 |
| AR [class] | 3.3 | 3.3 | 3.3 | 4.3 | 4.3 | 4.3 |
| SR [class] | 5.3 | 5.3 | 5.3 | 51.3 | 51.3 | 51.3 |

While the invention has been illustrated and described as embodied in an optical glass, method of making the optical glass and optical elements made with the optical glass and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical glass having a composition, in wt. % based on oxide content, of:

|  |  |
|---|---|
| $P_2O_5$ | 40-58 |
| ZnO | 20-34 |
| $Li_2O$ | 0.5-5 |
| $GeO_2$ | 0.1-11 |
| $Nb_2O_5$ | 0-5. |

2. The glass according claim 1, further comprising at least one component selected from the group consisting of MgO, CaO, SrO and BaO, wherein MgO, when present, is contained in an amount of at most 3 wt %; SrO, when present, is contained in an amount of at most 3 wt. %; CaO, when present, is contained in an amount of at most 5 wt. %; and BaO, when present, is contained in an amount of at most 10 wt. %; and a sum total amount of MgO, CaO, SrO and BaO is at most 12 wt. %.

3. The glass according to claim 1, further comprising at least one component selected from the group consisting of $SiO_2$, $B_2O_3$ and $Al_2O_3$, and wherein, when present, $SiO_2$, is contained in an amount of at most 5 wt. %; when present, $B_2O_3$ is contained in an amount of at most 5 wt. %; and, when present, $Al_2O_3$ is contained in an amount of at most 5 wt. %; and a sum total amount of $SiO_2$, $B_2O_3$ and $Al_2O_3$ is at most 9 wt. %.

4. The glass according to claim 1, further comprising at least one component selected from the group consisting of $La_2O_3$, $TiO_2$ and $Ta_2O_5$, and wherein each of $La_2O_3$ and $TiO_2$, when present, is contained in an amount of at most 5 wt. %; $Ta_2O_5$, when present, is contained in an amount of at most 2 wt. %, and a sum total amount of $La_2O_3$, $TiO_2$ and $Ta_2O_5$ is at most 9 wt. %.

5. The glass according to claim 1, further comprising at most 1 wt. % of fluorine in the form of fluoride.

6. The glass according to claim 1, which is free of $As_2O_3$, PbO, $Na_2O$, $K_2O$, $Cs_2O$ and/or $SiO_2$.

7. The glass according to claim 1, containing at least one of the following components as a fining agent with each of the components in a stated amount in wt. %:

|  |  |
|---|---|
| $Sb_2O_3$ | 0-1 and/or |
| SnO | 0-1 and/or |
| NaCl | 0-1 and/or |
| $SO_4^{2-}$ | 0-1 and/or |
| $F^-$ | 0-1 and/or |
| inorganic peroxides | 0-1. |

8. The glass according to claim 1, having a refractive index $n_d$ of $1.55 \leq n_d \leq 1.64$ and/or an Abbe number $v_d$ of $42 \leq v_d \leq 65$.

9. The glass according to claim 1, having a refractive index $n_d$ of $1.56 \leq n_d \leq 1.63$ and/or an Abbe number $v_d$ of $43 \leq v_d \leq 64$.

10. An optical element made with an optical glass according to claim 1.

11. The optical element according to claim 10, which is a lens, a prism, a light guide rod, an array, an optical fiber, a gradient component and an optical window.

12. A pressed gob formed from an optical glass according to claim 1, which can be pressed after reheating.

13. An optical component comprising an optical glass according to claim 1.

14. A method of producing an optical component, said method comprising the step of blank pressing an optical glass according to claim 1.

15. An optical part or optical component for imaging, sensors, microscopy, medical technology, digital projection, telecommunication, optical communications engineering/information transmission, optics/lighting in the automotive field, solar technology, photolithography, steppers, excimer lasers, wafers, computer chips and/or integrated circuits and electronic devices containing such circuits and chips, said optical part or optical component comprising at least one optical element made from a glass according to claim 1.

16. The glass according to claim 1, which is free of coloring components.

* * * * *